United States Patent [19]
Oslin et al.

[11] Patent Number: 5,649,528
[45] Date of Patent: Jul. 22, 1997

[54] DRAIN ASSEMBLY FOR STEAMER APPARATUS

[75] Inventors: G. Robert Oslin, Chicago; Edward Droho, West Chicago, both of Ill.

[73] Assignee: Delaware Capital Formation, Inc., Wilmington, Del.

[21] Appl. No.: 651,938

[22] Filed: May 21, 1996

[51] Int. Cl.⁶ ........................................... A21B 1/08
[52] U.S. Cl. ...................... 126/20; 126/369; 126/20.1; 261/118
[58] Field of Search ................... 126/20, 20.1, 369, 126/348; 122/44.2, 135.2, 16, 17; 261/118; 99/330, 339; 219/401; 34/74, 75

[56] References Cited

U.S. PATENT DOCUMENTS

| | | | |
|---|---|---|---|
| 3,818,819 | 6/1974 | Shulz et al. | 126/20 |
| 4,281,636 | 8/1981 | Vegh et al. | 126/369 |
| 4,506,598 | 3/1985 | Meister | 126/20 |
| 5,368,008 | 11/1994 | Oslin | 126/20.1 |

Primary Examiner—James C. Yeung
Attorney, Agent, or Firm—Welsh & Katz, Ltd.

[57] ABSTRACT

A drain assembly is disclosed for use in a steamer type food processing apparatus having an oven chamber into which steam is introduced and from which steam bubbles may escape with condensate through a drain line. The drain assembly includes a tubular body having a longitudinal flow passage defining an inlet end adapted to receive steam droplets and condensate from the oven chamber, an outlet end enabling discharge of condensate from the flow passage, a quenching fluid inlet tube and splash plate operative to create a fluid screen across the flow passage downstream from said inlet end, a vent tube intersecting the flow passage downstream from the quenching fluid inlet to enable escape of vapor from the flow passage, and an overflow tube connected to said flow passage and configured to create a fluid trap within the overflow tube. The overflow tube allows backed-up condensate within the longitudinal flow passage to be discharged from the overflow tube in the event the discharge end is blocked.

5 Claims, 1 Drawing Sheet

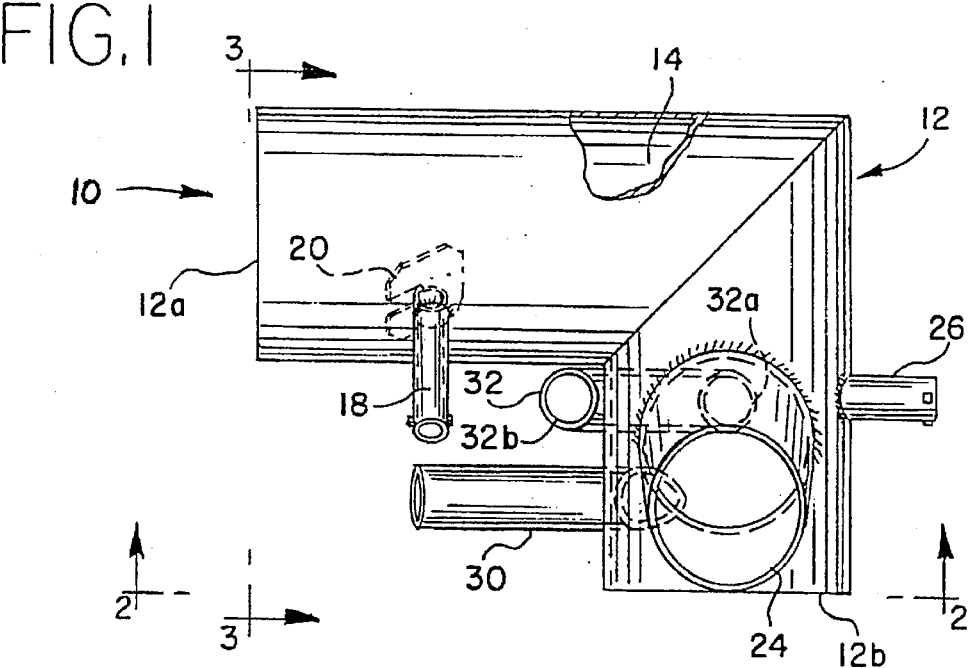
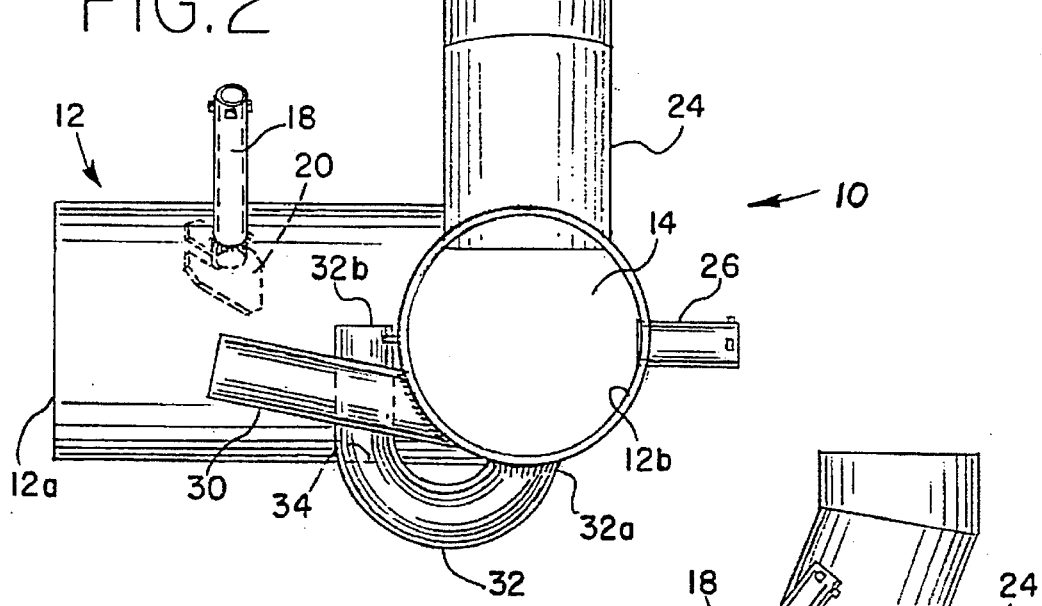
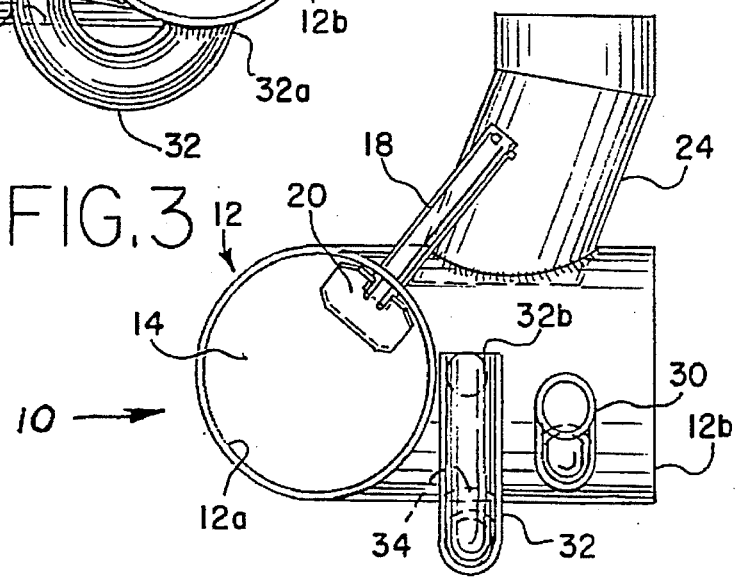

5,649,528

1

DRAIN ASSEMBLY FOR STEAMER APPARATUS

BACKGROUND OF THE INVENTION

The present invention relates generally to steamer type food processing apparatus, and more particularly to a novel drain assembly operative to receive steam bubbles and condensate from a steam chamber and having a vent tube and an overflow tube operative to vent gases from the assembly to enable discharge of condensate from the drain assembly in the event a discharge end of the drain assembly becomes clogged.

It is a conventional practice to cook many kinds of food products in a steamer apparatus by steam convection through introducing steam at atmospheric pressure into one or more cooking chambers, generally termed steam chambers. It is a common practice to provide in such a steamer apparatus a condensate line which is connected to a vented drain tank having a water spray and baffle plate means operative to quench and condense steam bubbles from the drain lines so as to prevent escape of steam out a vent tube or out a drain opening. See, for example, U.S. Pat. No. 5,368,008 which is assigned to the assignee of the present invention. As disclosed in this patent, a vented drain tank is provided having a water spray and baffle plate means operative to quench and condense steam bubbles received from the steam chamber. The drain tank is operative to prevent blockage of a vent tube and condensate drain lines when liquid is entrapped in the drain tank.

While the drain tank and associated quenching spray and baffle plate means as disclosed in the aforementioned patent have proven satisfactory for their intended use, the present invention provides a drain assembly having a unique overflow tube to enable discharge of any back-up condensate within the drain assembly in the event the normal discharge opening becomes clogged and without impeding venting of internal gas pressure within the device.

SUMMARY OF THE INVENTION

One of the primary objects of the present invention is to provide a novel drain assembly for use with a steam generator or the like operative to introduce steam into a steam chamber, and wherein the drain assembly has a generally tubular body having an inlet adapted for connection to the steam chamber through a drain line to receive steam bubbles and condensate from the steam chamber. A quenching tube is fixed to the drain assembly and a splash plate is supported internally of a primary fluid flow passage so that quenching fluid introduced into the quenching inlet impinges the splash plate and creates a screen of quenching fluid, such as water, across the primary flow passage. The drain assembly includes a vent tube intersecting the primary flow passage downstream from the inlet end to vent gases from internally of the primary flow passage. A generally U-shaped overflow tube is connected at one end to the primary flow passage at a lower end thereof. The overflow tube has a water trap therein to prevent escape of fluid from the primary flow passage. In the event a primary discharge end of the drain assembly becomes clogged, the overflow tube allows the discharge of backed up condensate within the drain assembly without impeding venting of gas out through the venting tube. Preferably, a drain tube from the boiler intersects the primary flow passage downstream from the overflow tube, and a drain tube from the front door of the steamer apparatus enables draining of condensate from the door.

Further objects, features and advantages of the present invention, together with the organization and manner of

2 operation thereof, will become apparent from the following detailed description when taken in conjunction with the accompanying drawing wherein like reference numerals designate like elements throughout the several views.

BRIEF DESCRIPTION OF THE DRAWING

FIG. 1 is a plan view of a drain assembly constructed in accordance with the present invention;

FIG. 2 is an end elevational view of the drain assembly of FIG. 1, taken substantially along line 2—2 of FIG. 1; and FIG. 3 is a side elevational view taken substantially along line 3—3 of FIG. 1.

DETAILED DESCRIPTION

Referring now to the drawing, a drain assembly constructed in accordance with the present invention is indicated generally at 10. The drain assembly 10, which may alternatively be termed a quenching device, is particularly adapted for use with a steamer type food processing apparatus having an oven chamber into which steam is introduced to cook food products disposed within the over chamber as disclosed generally in U.S. Pat. No. 5,368,008 which is incorporated herein by reference. Typically in steamers of this type, steam droplets and condensate from the walls of the oven chamber, as well as drippings from items being steam heated or cooked, may escape or be discharged through a drain line as disclosed generally in U.S. Pat. No. 5,368,008. The drain assembly 10 comprises an alternative to the drain tank and associated components disclosed in U.S. Pat. No. 5,368,008.

The drain assembly or quenching device 10 includes a generally tubular housing 12 defining an internal longitudinal flow passage 14 which extends from an inlet end 12a to an outlet end 12b of the tubular housing 12. In the illustrated embodiment, the tubular housing 12 has a generally 90° angle formed substantially midlength thereof so that the internal longitudinal flow passage 14 takes a generally 90° turn approximately midway between the inlet and outlet ends 12a and 12b.

The inlet end 12a of housing 12 is adapted for connection to a drain line or drain orifice within a steam chamber of a steamer in which food is steamed or cooked. The drain assembly or quenching device 10 has a quenching fluid inlet tube 18 fixed in radial relation to the tubular housing 12 downstream from the inlet opening end 12a so that the axis of the quenching fluid tube forms an included angle alpha of approximately 50° with a plane containing the longitudinal axis of tubular housing 12, as indicated in FIG. 3. The quenching fluid inlet tube 18 extends inwardly of the housing 12 a sufficient distance to enable a splash member or diverter plate 20 to be mounted thereon. The splash member 20 is preferably positioned to lie in a plane forming an angle of approximately 45° with the axis of the tubular housing 12. The quenching fluid inlet tube 18 is adapted to be connected to a source of quenching fluid, such as water, such that when quenching fluid is introduced into the inlet tube, it impinges against the splash plate 12 and creates a fluid film or water screen across substantially the full cross-section of the tube 12. The water screen or fluid film created by impingement of the quenching fluid against the splash plate 20 effects condensing of steam bubbles and droplets passing through the housing 12 from the inlet 12a.

A vent tube 24 having a diameter less than the diameter of tubular housing 12 is mounted on housing 12, as by welding, peripherally of a suitable opening in the tubular housing so that an internal vent passage within the vent tube 24 intersects the longitudinal flow passage within housing 12. Preferably, the vent tube 24 is fixed to the housing at an uppermost position thereon so that any gases or vapors within housing 12 that do not pass outwardly of the discharge end 12b will be discharged through the vent tube 24. A smaller diameter metallic tube 26 is mounted on the housing 12 such that the longitudinal axis of tube 26 lies in a horizontal plane containing the longitudinal axis of the flow passage within tubular housing 12, as considered in FIG. 2. The tube 26 is adapted to be connected to a drain trap, such as from the front door of an oven or steamer with which the drain assembly 10 is employed. In this manner, any liquid or condensate from the door will pass into the housing 12 downstream from the inlet 12a and quenching fluid splash plate 20.

The drain assembly 10 includes a tubular member 30 which is fixed to the housing 12 in an inclined relation, as illustrated in FIG. 2, and is adapted for connection to a drain line from a boiler, such as an atmospheric boiler utilized in a steamer apparatus with which the drain assembly 10 may be employed. The boiler drain tube 30 communicates with the internal flow passage 14 so that liquid from the boiler, such as water, will drain into the tubular housing 12 and be discharged from end 12b.

In accordance with one feature of the drain assembly 10, an overflow tube 32 of generally U-shaped configuration has an end 32a fixedly connected to the tubular housing 12 at a lowermost point of curvature, as illustrated in FIG. 2, so that the overflow tube communicates with the lower region of the internal flow passage 14. An upper end 32b of the overflow tube 32 extends slightly above the plane of the center axis of the flow passage 14 in housing 12. The overflow tube 32 normally contains a quantity of fluid, such as water, at a level as indicated at 34 in FIG. 2 to form a liquid trap preventing escape of gas or vapor from the flow passage 14.

In the operation of the drain assembly 10, the inlet end 12a is connected to a drain tube from a steamer apparatus steam chamber so that condensate and steam bubbles passing from the steam chamber enter the inlet end 12a of the tubular housing 12 and contact the water screen created by quenching fluid impinging the splash plate 20. As the steam droplets and condensate are cooled within the housing 12 they flow outwardly through the discharge end 12b to a suitable drain or collection apparatus. Simultaneously, any gases or vapors within the tubular housing 12 pass outwardly through the vent tube 24. Similarly, any liquid or condensate draining from the steamer door, and any fluid or drain from the boiler, may enter the drain assembly housing 12 through the tubes 26 and 30, respectively. During operation, the overflow tube 32 has a water or other liquid trap formed therein which normally prevents the escape of gases or liquid from the housing 12 other than through the discharge end 12b. In the event the main drain 12b becomes clogged or is otherwise prevented from freely discharging from the housing 12, the condensed steam bubbles and liquid entering the inlet end 12a of the housing 12 will flow outwardly of the open end 32b of the overflow tube 32 and thereby not inhibit venting of gases through the vent tube 24.

While a preferred embodiment of the drain assembly 10 in accordance with the present invention has been illustrated and described, it will be understood that changes and modifications may be made therein without departing from the invention its broader aspects. Various features of the invention are defined in the following claims.

What is claimed is:

1. A drain assembly for use in a steamer type food processing apparatus having an oven chamber into which steam is introduced and from which steam may escape with condensate through a drain line; said drain assembly comprising a tubular body having a longitudinal flow passage defining an inlet end adapted to receive steam droplets and condensate from the oven chamber, an outlet end enabling discharge of condensate from the flow passage, a quenching fluid inlet intersecting said flow passage, a splash member disposed within said flow passage in a position to be impinged by quenching fluid introduced into said quenching fluid inlet and create a fluid screen across the flow passage downstream from said inlet end, a vent tube intersecting said flow passage downstream from the quenching fluid inlet to enable escape of vapor from the flow passage, and an overflow tube connected to said flow passage and configured to create a fluid trap within the overflow tube, said overflow tube being operative to allow backed-up condensate within the longitudinal flow passage to be discharged from the overflow tube.

2. A drain assembly as defined in claim 1 wherein said overflow tube is generally U-shaped and has a first end connected to said tubular body at a low point in the longitudinal flow passage, said overflow tube having an outlet end disposed at an elevation approximately corresponding to the axis of the longitudinal flow passage.

3. A drain assembly as defined in claim 1 including a boiler drain inlet line intersecting the longitudinal flow passage downstream from said overflow tube.

4. A drain assembly as defined in claim 1 wherein the food processing apparatus has a door operative to close the oven chamber, said tubular body including a further drain inlet adapted for connection to a condensate drain from the door.

5. In a steamer apparatus of the type including a cabinet having at least one oven chamber therein, and having steam generator means interconnected to said oven chamber and operative to supply steam to said chamber, a drain line from said oven chamber for receiving condensate and steam bubbles that may escape from said oven chamber; the combination therewith comprising a drain assembly including a first tubular member defining a primary flow passage longitudinally therethrough and having a first end adapted for connection to the drain line from the oven chamber so as to receive condensate and steam bubbles therefrom, a quenching fluid flow line connected to the first tubular member and having an internal flow passage communicating with the longitudinal flow passage through the first tubular member, a splash plate supported within the primary flow passage so as to be impinged by quenching fluid introduced through said quenching fluid flow tube and create a quenching fluid screen across the primary flow passage, a vent tube connected to said first tubular member and communicating with the primary flow passage so as to vent the primary flow passage to atmosphere in an upper region thereof downstream from said quenching fluid inlet tube, and a generally U-shaped overflow tube connected to said first tubular member so as establish a water trap within said overflow tube, said first tubular member having a discharge end operative to discharge fluids from the first tubular member, said overflow tube being operative to enable discharge of fluid accumulated in the first tubular member in the event said discharge end of said first tubular member becomes blocked.

* * * * *